United States Patent
Bhadriraju et al.

(10) Patent No.: US 8,570,159 B2
(45) Date of Patent: Oct. 29, 2013

(54) MANIFEST INTEGRITY MANAGEMENT VIA RADIO FREQUENCY IDENTIFICATION (RFID)

(75) Inventors: Vijay Kumar Bhadriraju, Durham, NC (US); Thomas Tim Hanis, Raleigh, NC (US); Frederick William Rowe, Raleigh, NC (US); John Kenneth Senegal, Durham, NC (US); Donnie Allen Smith, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 591 days.

(21) Appl. No.: 12/605,166

(22) Filed: Oct. 23, 2009

(65) Prior Publication Data
US 2011/0095872 A1    Apr. 28, 2011

(51) Int. Cl.
*H04Q 5/22*    (2006.01)
(52) U.S. Cl.
USPC ..................................... 340/10.52

(58) Field of Classification Search
USPC ................. 340/10.1, 505, 10.52, 10.4, 12.51; 235/383
See application file for complete search history.

(56) References Cited

U.S. PATENT DOCUMENTS

| | | | |
|---|---|---|---|
| 6,496,806 B1 * | 12/2002 | Horwitz et al. | 705/28 |
| 7,256,682 B2 * | 8/2007 | Sweeney, II | 340/10.1 |
| 2008/0231426 A1 * | 9/2008 | Kamel | 340/10.4 |

* cited by examiner

*Primary Examiner* — Vernal Brown
(74) *Attorney, Agent, or Firm* — Steven M. Greenberg, Esq.; Carey, Rodriguez, Greenberg & O'Keefe

(57) ABSTRACT

Embodiments of the invention provide a method, system and computer program product for manifest integrity management via radio frequency identification (RFID). A manifest integrity management method can include scanning different RFID tags affixed to different objects for placement in a container. The method also can include determining both common data for all of the different RFID tags, and unique data for each of the different RFID tags. Finally, the method can include encoding an RFID tag for the container with an entry for the common data for the different RFID tags, and each unique data for each of the different RFID tags. In this way, a manifest can be created for the objects in the container.

6 Claims, 3 Drawing Sheets

MANIFEST INTEGRITY MANAGEMENT VIA RADIO FREQUENCY IDENTIFICATION (RFID)

BACKGROUND OF THE INVENTION

1. Field of the Invention

The present invention relates to the field of Radio Frequency Identification (RFID) and more particularly to manifest integrity management through RFID.

2. Description of the Related Art

RFID is an area of automatic identification that has quietly been gaining momentum in recent years and is now being seen as a radical means of enhancing data handling processes, complimentary in many ways to other data capture technologies such bar coding. The object of any RFID system is to carry data in suitable transponders, generally known as tags, and to retrieve data, by machine readable means, at a suitable time and place to satisfy particular application needs. Data within a tag may provide identification for an item in manufacture, goods in transit, a location of an item, the identity of a vehicle, an animal or an individual. By including additional data the prospect is provided for supporting applications through item specific information or instructions immediately available on reading the tag.

An RFID object tracking system requires, in addition to tags, a means of reading or interrogating the tags and some means of communicating the data to a host computer or information management system. In this respect, an RFID object tracking system also can include a facility for programming data into the tags. Notably, the tags can be active and powered in nature, or passive and unpowered in nature. Communication of data between tags and a reader can be by wireless communication. Two methods distinguish and categorize RFID object tracking systems, one based upon close proximity electromagnetic or inductive coupling and one based upon propagating electromagnetic waves. Coupling is via 'antenna' structures forming an integral feature in both tags and readers. While the term antenna is generally considered more appropriate for propagating systems it is also loosely applied to inductive systems.

RFID systems can be roughly grouped into four categories: electronic article surveillance (EAS) systems, portable data capture systems, networked systems and positioning systems. EAS systems typically involve a one bit system used to sense the presence or absence of an item. Portable data capture systems, by comparison, can be characterized by the use of portable data terminals with integral RFID readers and can be used in applications where a high degree of variability in sourcing required data from tagged items may be exhibited. Networked system applications can generally be characterized by fixed position readers deployed within a given site and connected directly to a networked information management system. The transponders are positioned on moving or moveable items, or people, depending upon application. Finally, positioning systems use transponders to facilitate automated location and navigation support for guided vehicles.

Despite the ability to track an item or identify an item readily according to RFID, tracking a single item in of itself cannot cure the challenges facing the mass shipment of product. In particular, once product has been encapsulated within a container for shipment, verifying the identity of a single parcel in the container can be physically near impossible as to do so would require the physical retrieval of the parcel to ensure the correct RFID tag has been read to the exclusion of other RFID tags on other parcels in the container. The problem of ensuring a manifest for a container (namely, the listing of contents of a container) not only is a supply chain problem, but also a problem of security and loss prevention.

BRIEF SUMMARY OF THE INVENTION

Embodiments of the present invention address deficiencies of the art in respect to assuring manifest integrity for a shipping container of objects and provide a novel and non-obvious method, system and computer program product for manifest integrity management via RFID. In an embodiment of the invention, a manifest integrity management method can include scanning different RFID tags affixed to different objects for placement in a container. The method also can include determining both common data for all of the different RFID tags, and unique data for each of the different RFID tags. Finally, the method can include encoding an RFID tag for the container with an entry for the common data for the different RFID tags, and each unique data for each of the different RFID tags. In this way, a manifest can be created for the objects in the container.

Subsequently, the different RFID tags affixed to different objects placed within in a container can be scanned, as can an RFID tag affixed to the container. Both common data for all of the different RFID tags affixed to the different objects placed within the container, and unique data for each of the different RFID tags affixed to the different objects placed within the container can be determined. Yet further, common data can be extracted from the RFID tag affixed to the container and also a sequence of unique data can be extracted from the RFID tag affixed to the container. Finally, the unique data for each of the different RFID tags affixed to the different objects placed within the container can be compared to the unique data extracted from the RFID tag affixed to the container to confirm a manifest defined by the RFID tag affixed to the container.

In one aspect of the embodiment, encoding an RFID tag for the container with an entry for the common data for the different RFID tags, and each unique data for each of the different RFID tags, can include creating a header for the RFID tag for the container comprising a length of the header, a number of the different RFID tags, a length of the unique data for each of the different RFID tags, and the common data. Additionally, the header can be combined with each unique data for each of the different RFID tags. Finally, the combination can be written to the ID memory of the RFID tag for the container.

In another embodiment of the invention, an RFID data processing system can be configured for manifest integrity management. The system can include a host computer with processor and memory, an RFID reader and an RFID data acquisition application coupled to the RFID reader and executing in the memory of the host computer by the processor of the host computer. The system further can include a manifest management module coupled to the RFID data acquisition application and executing in memory of the same or another host computer by the processor of the same or another host computer. The module can include computer usable program code enabled to direct the RFID data acquisition application to scan different RFID tags affixed to different objects for placement in a container, to determine both common data for all of the different RFID tags, and unique data for each of the different RFID tags, and to encode an RFID tag for the container with an entry for the common data for the different RFID tags, and each unique data for each of the different RFID tags.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for manifest integrity management via RFID. In accordance with an embodiment of the present invention, different RFID tags affixed to correspondingly different objects for placement in a container can be read to extract the ID memory of each of the different RFID tags. Common bits for all extracted ID memories of the different RFID tags can be computed and stored in an ID memory of an RFID tag for the container. Additionally, remaining differing sets of bits for each RFID tag each set that uniquely identifies a corresponding RFID tag can be encoded as a value in the ID memory of the RFID tag for the container. A length of each set of bits for each RFID tag further can be stored in the ID memory of the RFID tag for the container as can a value for a number of the RFID tags affixed to correspondingly different objects for placement in the container. Finally, the common bits can be stored in the ID memory of the RFID tag for the container. In this way, the ID memory for the RFID tag for the container can include a compressed form of a complete manifest for the container. Consequently, a subsequent scan of all RFID tags affixed to objects in the container can produce a new manifest for comparison with the ID memory of the RFID tag for the container. The comparison of the new manifest with the complete manifest for the container can confirm the manifest of the container without requiring the ID memory of the RFID tag of the container to store a complete copy of each ID memory of each of the RFID tag affixed to a corresponding object in the container.

Figure 1:
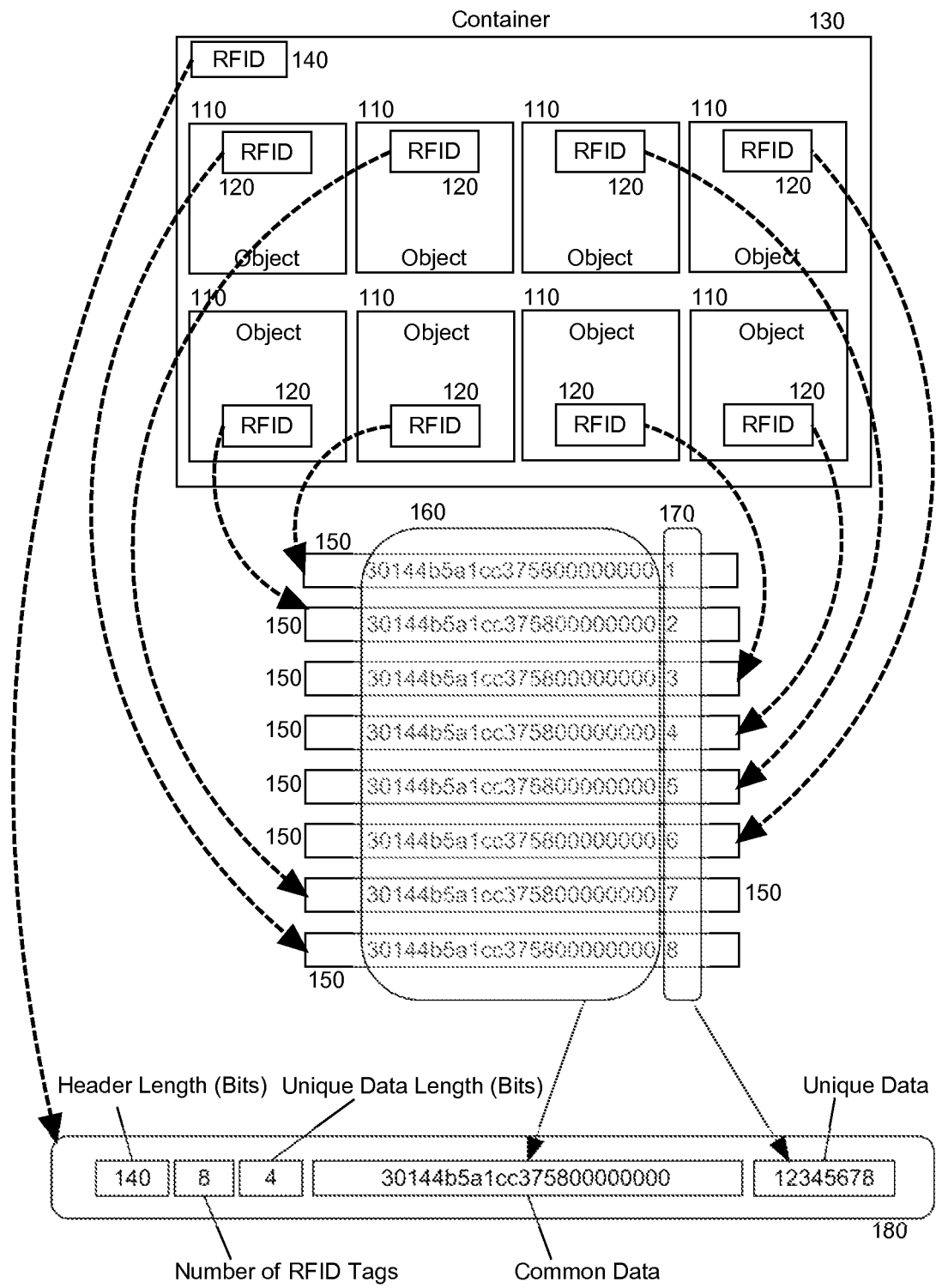
FIG. 1 is a pictorial illustration of a process for manifest integrity management via RFID.

In further illustration, FIG. 1 is a pictorial illustration of a process for manifest integrity management via RFID. As shown in FIG. 1, multiple different objects 110 can be placed in a container 130. Each object 110 can include an RFID tag 120 affixed thereto. Each RFID tag 120 can provide an ID memory 150 as is well known in the art. The ID memory 150 can include data stored therein—typically ninety-six (96) bits of data. The data itself can be an identifier associated with the RFID tag 120. For each of the RFID tags 120 affixed to the objects 110, the corresponding ID memory 150 can be read to determine common data 160 amongst the different ID memories 150. The remaining data of the different ID memories 150 can be determined to be unique data 170 unique to the ID memory 150 of a specific corresponding RFID tag 120.

An ID memory 180 of a container RFID tag 140 affixed to the container 130 and acting as a manifest for the container 130 can be encoded to include not only a single instance of the common data 160, but also a sequence of the unique data 170 for each ID memory 150 of each corresponding RFID tag 120 for each corresponding object 110. Further, a number of RFID tags 120 read in the container 130 can be written to the ID memory 180 of the container RFID tag 140 as can the data length of the unique data 170 for each ID memory 150 of each corresponding RFID tag 120 and a total length of a header portion of the ID memory 180 that includes the header length field (for instance sixteen (16) bits), number of RFID tags field (16 bits), unique data length (16 bits), the common data (ninety-two (92) bits) and the unique data 170. In this way, the encoded content of the ID memory 180 can be subsequently expanded to provide the content for each ID memory 150 of each corresponding RFID tag 120. As such, reading the content of each RFID tag 120 and the container RFID tag 140 at a subsequent time can confirm the manifest of the container RFID tag 140.

Figure 2:
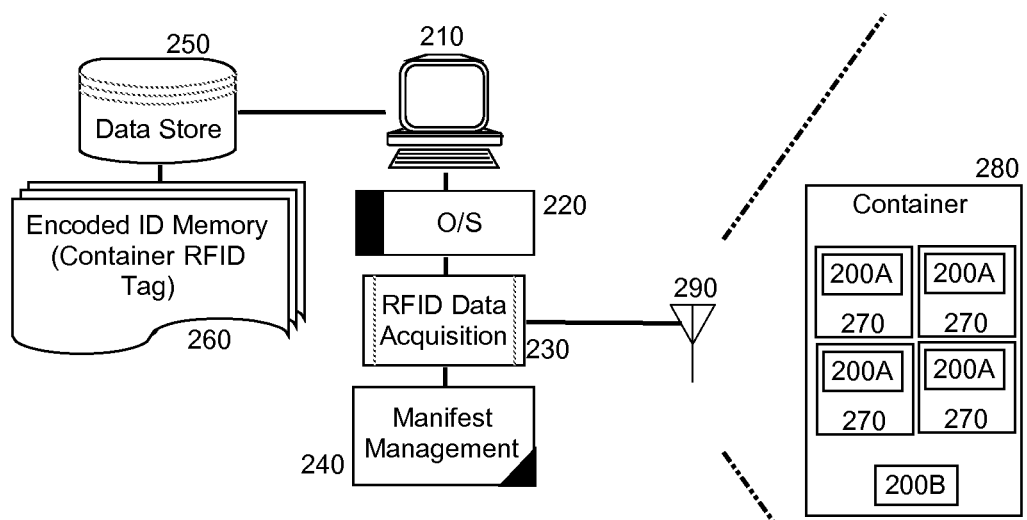
FIG. 2 is a schematic illustration of an RFID data processing system configured for manifest integrity management via RFID.

The process illustrated in FIG. 1 can be implemented in an RFID data processing system. In yet further illustration, FIG. 2 is a schematic illustration of an RFID data processing system configured for manifest integrity management via RFID. The system can include a host computer 210 with processor and memory hosting the execution of an operating system 220 and coupled to a data store 250, such as fixed storage. The operating system 220 can support the operation of an RFID data acquisition application 230 configured to communicate with an RFID reader 290 to acquire data from different RFID tags within a sensing zone of the RFID reader 290.

Of note, a manifest management module 240 can be coupled to the RFID data acquisition application 230 and also can execute in the host computer 210 by way of the operating system 220. The manifest management module 240 can include computer usable program code which when executed by the processor of the host computer 210 by way of the operating system 220, can be enabled to direct the RFID data acquisition application 230 to scan RFID tags affixed to different objects 270 for placement in a container 280 within the sensing zone, and to the computer usable program code can be enabled to extract the resulting content of the ID memories of different RFID tags 200A. The computer usable program code when executed by the processor also can be enabled to determine common data for each of the ID memories of the RFID tags 200A and unique data for the ID memories of the RFID tags 200A.

Yet further, the computer usable program code when executed by the processor can be enabled to encode the ID memory of a container RFID tag 200B with a single entry of the common data for all of the RFID tags 200A and the unique data for each of the RFID tags 200A, as well as additional information such as the number of RFID tags 200A present in the container 280, and various data lengths to permit decoding of the unique data and the common data. Optionally, the computer usable program code when executed by the processor can be enabled to store the content of the ID memory for the container RFID tag 200B as a record 260 in the data store 250.

Figure 3:
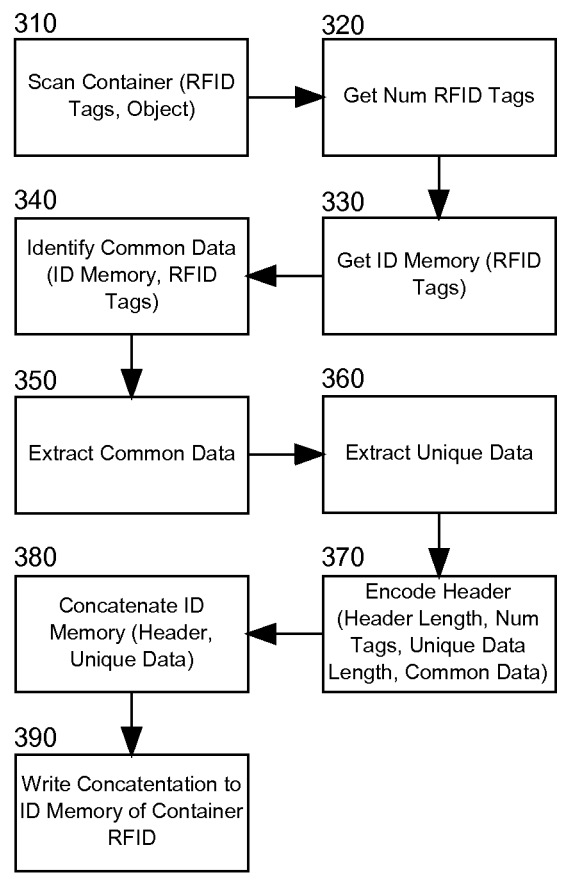
FIG. 3 is a flow chart illustrating a process for manifest creation for a container RFID; and, FIG. 4 is a flow chart illustrating a process for manifest creation for a container RFID.

In yet further illustration of the process described in connection with the manifest management module 240, FIG. 3 is a flow chart illustrating a process for manifest creation for a container RFID. Beginning in block 310, RFID tags affixed to objects for placement in a container can be scanned, whether individually prior to placement into a container, or subsequent to placement within the container. The process of scanning the RFID tags can include extracting data from the ID memories of each RFID tag—typically 96 bits of data. In block 320, the number of RFID tags scanned can be determined and in block 330, the content of each ID memory of each corresponding scanned RFID tag can be placed in memory.

In block 340, common data for each ID memory can be determined. For instance, the bits of two different ID memories can be compared at a time from high bit to low bit until a difference in bits is detected. The number of bits found to be identical can be recorded and one of the compared ID memories can be compared against a next ID memory in the same way. When all ID memories have been compared to one another, a lowest value of identical bits can be used to determine the common data for all ID memories—namely the data represented by the lowest value of identical bits beginning at the high bit of each ID memory. As such, in block 350 the common data can be extracted from one of the ID memories of the scanned RFID tags and the remaining data for each ID memory for each corresponding scanned RFID tag can be extracted as well in block 360.

In block 380, a header for an ID memory of a container RFID tag can be constructed by concatenating data as follows:

| | |
|---|---|
| 16 Bits: | Header Length |
| 16 Bits: | Number of RFID Tags Scanned |
| 16 Bits: | Length of Unique Data |
| Variable: | Common Data |

Thereafter, the header can be combined with a sequence of the unique data for each ID memory of each corresponding scanned RFID tag and encoded as the ID memory for the container RFID tag. Finally, in block 390 the encoded ID memory can be written to the container RFID tag affixed to the container. In this way, at a subsequent time, the container RFID tag can be scanned to determine a manifest of the objects in the container. The manifest can be compared to a scan of all RFID tags affixed to objects in the container to confirm the presence of the objects in the container as set forth by the manifest embodied by the encoded ID memory of the container RFID tag.

Figure 4:
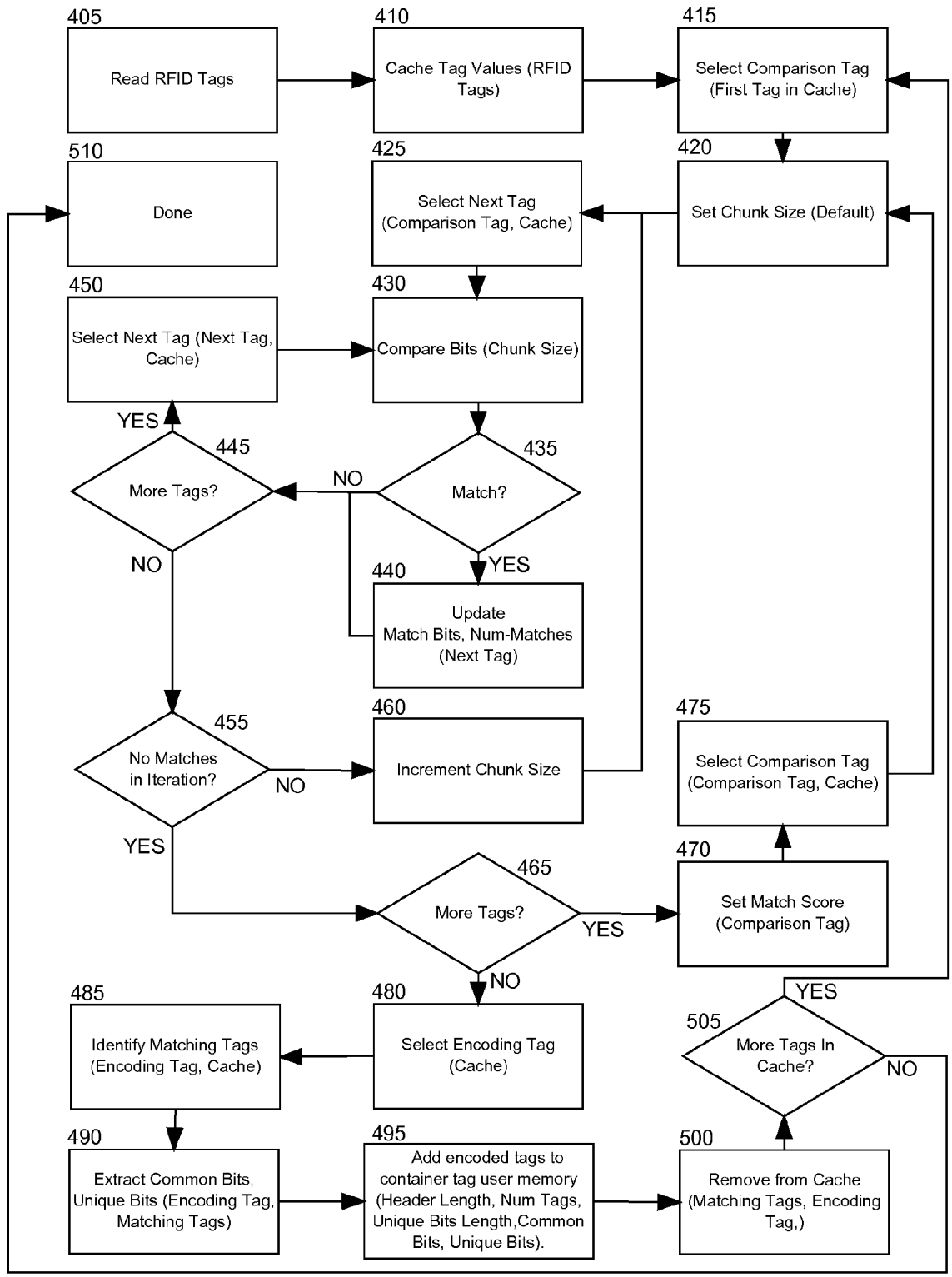

In even yet further illustration of the process of FIG. 3, a flow chart is shown by way of FIG. 4 illustrating a process for manifest creation for a container RFID. Beginning in block 405, RFID tags affixed to objects for placement in a container can be scanned, whether individually prior to placement into a container, or subsequent to placement within the container. In block 410, tag values for each of the RFID tags can be written to a table in memory serving as a cache for generating a manifest of the RFID tags of the container. In block 415 a first tag value in the cache can be selected as an initial comparison tag, and block 420, a default chunk size can be set—for instance four bits. In block 425, a next tag value in the cache can be selected for comparison to the comparison tag value to identify common data for corresponding ones of the RFID tags. Accordingly, in block 430, only a number of leftmost bits for the tag values of the cached tag values corresponding to the chunk size can be compared.

In decision block 435, if any of the leftmost bits match, in block 440 an entry can be updated for the tag value in the cache for a sum of the number of bits matched and a number of matches having occurred with comparison tag values. Thereafter, in block 445 if additional tag values remain to be compared to the comparison tag value, in block 450 a next tag value in the cache can be retrieved and the comparison iteration can repeat in block 430 using the established chunk size. When all tag values in the cache have been compared to the comparison tag value, however, in decision block 455 it further can be determined if no portions of the tag values compared to the comparison tag have matched for the established chunk size.

In particular, in decision block 455 if at least one tag value during the comparison iteration matched the comparison tag value, then in block 460 the chunk size can be incremented by a value and in block 425 the process of comparing the comparison tag value to the other tag values in the cache can be repeated using the new, larger chunk size, all the while updating the number of matching bits and number of matches for tag values in the cache matching the comparison tag. In decision 455, when no tag values during the comparison iteration have matched the comparison tag value, then in decision block 465 it can be determined whether all tag values in the cache have acted as a comparison tag during the comparison process.

If not, then in block 470 a match score can be computed for the comparison tag value as a product of the number of matching bits and number of matches for the comparison tag value. Subsequently, in block 475 a new comparison tag value can be selected from amongst the tag values in the cache and the process can repeat anew in block 415 by setting the default chunk size in block 420. If so, then in block 480 an encoding tag value can be chosen as the tag value in the cache enjoying the highest match score. Further, in block 485 tag values in the cache matching the encoding tag value can be identified and in block 485 the common bits from the encoding tag value and the matching tag values can be extracted along with any unique bits of the matching tag values and the encoding tag value. In block 495 the encoded tags can be written to the user memory of the container tag to account for a header length, number of tags, unique bits length, common bits and unique bits, all determined from the encoding tag and the other tag values in the cache.

Finally, in block 500 the matching tag values and the encoding tag value can be removed from the cache. In decision block 505, if more tag values remain in the cache subsequent to the removal of the matching tag values and the encoding tag value, the process can repeat through block 415 so that a new tag value can be computed for selected ones of the remaining tag values in the cache accounting for header length, number of tag values matching a new encoding tag value with a highest match score, unique bits length of the new encoding tag value, common bits and unique bits. The new tag value can be concatenated to existing values of the container tag. Again, in decision block 505 if yet additional tag values remain in the cache, the process can repeat yet again through block 415. Ultimately, when no tag values remain in the cache the process can end in block 510.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A manifest integrity management method comprising:
   scanning different radio frequency identification (RFID) tags affixed to different objects for placement in a container;
   determining both common data for all of the different RFID tags, and unique data for each of the different RFID tags; and,
   encoding an RFID tag for the container with an entry for the common data for the different RFID tags, and each unique data for each of the different RFID tags, wherein encoding the RFID tag for the container with the entry for the common data for the different RFID tags, and each unique data for each of the different RFID tags, comprises:
   creating a header for the RFID tag for the container comprising a length of the header, a number of the different RFID tags, a length of the unique data for each of the different RFID tags, and the common data;
   combining the header with each unique data for each of the different RFID tags; and,
   writing the combination to an identification (ID) memory of the RFID tag for the container.

2. The method of claim 1, further comprising:
   scanning different RFID tags affixed to different objects placed within the container, and also the RFID tag affixed to the container;
   determining both common data for all of the different RFID tags affixed to the different objects placed within the container, and unique data for each of the different RFID tags affixed to the different objects placed within the container;
   extracting common data from the RFID tag affixed to the container and also a sequence of unique data from the RFID tag affixed to the container; and,
   comparing the unique data for each of the different RFID tags affixed to the different objects placed within the container to the unique data extracted from the RFID tag affixed to the container to confirm a manifest defined by the RFID tag affixed to the container.

3. A radio frequency identification (RFID) data processing system configured for manifest integrity management, the system comprising:
   at least one host computer with processor and memory;
   an RFID reader;
   an RFID data acquisition application coupled to the RFID reader and executing in memory of at least one host computer by a processor therein; and,
   a manifest management module coupled to the RFID data acquisition application and executing in memory of at least one host computer by a processor therein, the module comprising computer usable program code enabled to direct the RFID data acquisition application to scan different RFID tags affixed to different objects for placement in a container, to determine both common data for all of the different RFID tags, and unique data for each of the different RFID tags, and to encode an RFID tag for the container with an entry for the common data for the different RFID tags, and each unique data for each of the different RFID tags,
   wherein to encode the RFID tag for the container with the entry for the common data for the different RFID tags, and each unique data for each of the different RFID tags, comprises computer usable program code enabled to create a header for the RFID tag for the container comprising a length of the header, a number of the different RFID tags, a length of the unique data for each of the different RFID tags, and the common data, to combine the header with each unique data for each of the different RFID tags, and to write the combination to an identification (ID) memory of the RFID tag for the container.

4. The system of claim 3, wherein the manifest management further comprises computer usable program code enabled to direct the RFID data acquisition application to scan different RFID tags affixed to different objects placed within in the container, and also the RFID tag affixed to the container, to determine both common data for all of the different RFID tags affixed to the different objects placed within the container, and unique data for each of the different RFID tags affixed to the different objects placed within the container, to extract common data from the RFID tag affixed to the container and also a sequence of unique data from the RFID tag affixed to the container, and to compare the unique data for each of the different RFID tags affixed to the different objects placed within the container to the unique data extracted from the RFID tag affixed to the container to confirm a manifest defined by the RFID tag affixed to the container.

5. A computer program product comprising a
   computer usable storage medium storing computer executable program code for manifest integrity management, the computer program product comprising:
   computer executable program code for scanning different radio frequency identification (RFID) tags affixed to different objects for placement in a container;
   computer executable program code for determining both common data for all of the different RFID tags, and unique data for each of the different RFID tags; and, computer executable program code for encoding an RFID tag for the container with an entry for the common data for the different RFID tags, and each unique data for each of the different RFID tags, wherein the computer executable program code for encoding the RFID tag for the container with the entry for the common data for the different RFID tags, and each unique data for each of the different RFID tags, comprises:

computer executable program code for creating a header for the RFID tag for the container comprising a length of the header, a number of the different RFID tags, a length of the unique data for each of the different RFID tags, and the common data;

computer executable program code for combining the header with each unique data for each of the different RFID tags; and, computer executable program code for writing the combination to an identification (ID) memory of the RFID tag for the container.

6. The computer program product of claim 5, further comprising:

computer executable program code for scanning different RFID tags affixed to different objects placed within in the container, and also the RFID tag affixed to the container;

computer executable program code for determining both common data for all of the different RFID tags affixed to the different objects placed within the container, and unique data for each of the different RFID tags affixed to the different objects placed within the container;

computer executable program code for extracting common data from the RFID tag affixed to the container and also a sequence of unique data from the RFID tag affixed to the container; and, computer executable program code for comparing the unique data for each of the different RFID tags affixed to the different objects placed within the container to the unique data extracted from the RFID tag affixed to the container to confirm a manifest defined by the RFID tag affixed to the container.

* * * * *